(12) United States Patent
Jin et al.

(10) Patent No.: US 8,153,196 B2
(45) Date of Patent: Apr. 10, 2012

(54) COATING COMPOSITIONS, ARTICLES, AND METHODS OF COATING ARTICLES

(75) Inventors: Ren-Zhi Jin, Irvine, CA (US); Andreas Schneider, Fullerton, CA (US)

(73) Assignee: SDC Technologies, Inc., Irvine, CA (US)

( * ) Notice: Subject to any disclaimer, the term of this patent is extended or adjusted under 35 U.S.C. 154(b) by 0 days.

(21) Appl. No.: 13/288,166

(22) Filed: Nov. 3, 2011

(65) Prior Publication Data

US 2012/0049401 A1    Mar. 1, 2012

Related U.S. Application Data

(62) Division of application No. 12/852,213, filed on Aug. 6, 2010, which is a division of application No. 11/665,084, filed as application No. PCT/US2005/036458 on Oct. 12, 2005, now abandoned.

(60) Provisional application No. 60/618,014, filed on Oct. 12, 2004.

(51) Int. Cl.
*B05D 3/02* (2006.01)
*C09D 183/06* (2006.01)

(52) U.S. Cl. ......... 427/322; 427/386; 524/588; 525/477

(58) Field of Classification Search .................. None
See application file for complete search history.

(56) References Cited

U.S. PATENT DOCUMENTS

| | | | |
|---|---|---|---|
| 3,708,225 A | 1/1973 | Misch et al. |
| 3,922,436 A | 11/1975 | Bell et al. |
| 3,986,997 A | 10/1976 | Clark |
| 4,027,073 A | 5/1977 | Clark |
| 4,107,391 A | 8/1978 | Moore et al. |
| 4,149,206 A | 4/1979 | Loiselle |
| 4,177,315 A | 12/1979 | Ubersax |
| 4,188,451 A | 2/1980 | Humphrey, Jr. |
| 4,309,319 A | 1/1982 | Vaughn, Jr. |
| 4,355,135 A | 10/1982 | January |
| 4,444,973 A | 4/1984 | Schonfelder |
| 4,559,271 A | 12/1985 | Doin et al. |
| 4,839,443 A | 6/1989 | Akutsu et al. |
| 4,913,974 A | 4/1990 | Moore et al. |
| 5,013,608 A | 5/1991 | Guest et al. |
| 5,316,791 A | 5/1994 | Farber et al. |
| 5,618,626 A | 4/1997 | Nagashima et al. |
| 5,798,409 A | 8/1998 | Ho |
| 5,998,504 A | 12/1999 | Groth et al. |
| 6,001,163 A | 12/1999 | Havey et al. |
| 6,342,097 B1 | 1/2002 | Terry et al. |
| 6,346,331 B2 | 2/2002 | Harvey et al. |
| 6,348,269 B1 | 2/2002 | Terry |
| 6,479,057 B2 | 11/2002 | Allwohn et al. |
| 6,620,514 B1 | 9/2003 | Arpac et al. |
| 7,001,642 B2 | 2/2006 | Terry et al. |
| 7,097,704 B1 | 8/2006 | Pae |
| 7,265,179 B2 | 9/2007 | Jin et al. |
| 7,776,148 B2 | 8/2010 | Wagner |
| 2002/0086168 A1 | 7/2002 | Sadvary et al. |
| 2003/0198819 A1 | 10/2003 | Reusmann et al. |
| 2004/0076838 A1 | 4/2004 | Hage et al. |
| 2005/0171318 A1 | 8/2005 | Okuhira et al. |
| 2006/0159923 A1 | 7/2006 | Becker-Willinger et al. |
| 2008/0014339 A1 | 1/2008 | Schneider et al. |
| 2008/0145547 A1 | 6/2008 | Schneider |
| 2009/0297839 A1 | 12/2009 | Schneider et al. |

FOREIGN PATENT DOCUMENTS

| | | |
|---|---|---|
| CN | 1257531 | 6/2000 |
| DE | 19 649 183 A1 | 6/1998 |
| EP | 020613 | 5/1980 |
| EP | 190326 | 2/1986 |
| EP | 274466 | 1/1988 |
| EP | 324081 | 7/1989 |
| EP | 386297 | 9/1990 |
| EP | 845489 | 6/1998 |
| JP | 1268777 | 10/1989 |
| WO | 98/46692 | 10/1998 |
| WO | 03/037947 | 5/2003 |
| WO | 2006/044340 | 4/2006 |
| WO | 2007/114808 | 10/2007 |

OTHER PUBLICATIONS

Amberg-Schwab et al., "Protective coatings for organic polymers by sol-gel techniques", Materials Science Monographs, vol. 67, 1991, Abstract.
"Handbook of Coatings Additives", (ed. Leonard J. Calbo, pub Marcel Dekker), cover page, pp. ii-v, 119-145 and 225-269, 2004.
Loy et al., Bridged Polysilsesquioxanes Highly Porous Hybrid Organic-Inorganic Materials; J Chem Rev. pp. 1431-1442, 1995.
Harrison, Silicate cages: Precursors to New Materials; Journal of Organometal Chem, vol. 542, pp. 141-183, 1997.
Taber Industries, Jul. 2003: Important Notice Regarding TABER CS-10F Wheels, 3 pages.
Baney et al., "Silsequioxames"; T Chem Rev, vol. 95, pp. 1409-1430, 1995.
Hanssen et al., "On the formation and reactivity of multinuclear silsesquioxane metal complexes, Eindhoven: Technische Universiteit Eindhoven", 2003.
CAPLUS accession No. 1992:61613 for the Materials Science Monographs article by Amberg-Schwab et al., vol. 67, 1991, including chemical abstracts registry Nos. 94642-68-3 and 2530-83-3, four pages.

*Primary Examiner* — Robert Sellers
(74) *Attorney, Agent, or Firm* — Calfee, Halter & Griswold LLP

(57) ABSTRACT

Coating compositions, articles, and methods of coating articles are provided. The coating compositions and methods provide abrasion resistant formable coatings when cured on a substrate. The articles can be formed after the coating compositions are applied to a substrate and cured.

19 Claims, No Drawings

COATING COMPOSITIONS, ARTICLES, AND METHODS OF COATING ARTICLES

CROSS REFERENCE TO RELATED APPLICATIONS

This application is a divisional of, claims priority to, and any other benefit of allowed U.S. patent application Ser. No. 12/852,213, filed on Aug. 6, 2010, entitled "COATING COMPOSITIONS, ARTICLES, AND METHODS OF COATING ARTICLES," which is a divisional of, claims priority to, and any other benefit of abandoned U.S. patent application Ser. No. 11/665,084, filed on Jun. 11, 2007, entitled "COATING COMPOSITIONS, ARTICLES, AND METHODS OF COATING ARTICLES," which is the National Stage Entry of, claims priority to, and any other benefit of International Application Number PCT/US2005/036458, filed on Oct. 12, 2005, which claims priority to and any other benefit of U.S. Provisional Application No. 60/618,014 filed Oct. 12, 2004, the entire disclosures of which are all incorporated by reference herein.

FIELD OF THE INVENTION

The present invention relates to coating compositions, articles, and methods of coating articles. More particularly, the present invention relates to stable coating compositions that provide abrasion resistant formable coatings when cured on a substrate.

BACKGROUND

Glass glazing can be substituted with transparent materials, such as plastics, which do not shatter or are more resistant to shattering than glass. For example, transparent materials made from synthetic organic polymers are utilized in public transportation vehicles such as trains, buses, taxis and airplanes. Lenses for eye glasses and other optical instruments, as well as glazing for large buildings, can also employ shatter-resistant, transparent plastics. Additionally, the lighter weight of these plastics in comparison to glass can be a further advantage, especially in the transportation industry where the weight of the vehicle is a major factor in its fuel economy.

While transparent plastics provide the major advantage of being more resistant to shattering, lighter than glass, and having design flexibility, a serious drawback lies in the case with which these plastics mar and scratch due to everyday contact with abrasives such as dust or cleaning equipment. Marring results in impaired visibility and poor aesthetics, and often requires replacement of the glazing or lens or the like.

To improve the abrasion resistance of plastics, mar-resistant coatings have been developed. The main disadvantage of these abrasion resistant compositions is that they may not be formable after curing. Poor formability means that bending or working a coated article will often lead to cracking or crazing of the coating. As a consequence, articles must be coated after forming, which may entail time delays and shipment of uncoated articles which may be inadvertently abraded in transit. Thus, there remains a need in the art for coatings having good abrasion resistance and formability.

SUMMARY OF THE INVENTION

In accordance with embodiments of the present invention, compositions which, when applied to a substrate and cured, provide an abrasion resistant formable coating on the substrate are provided. The compositions can comprise an aqueous-organic solvent mixture having hydrolysis products and partial condensates of at least one of an epoxy functional silane and a diol functional organopolysiloxane and at least one multifunctional crosslinker, wherein the multifunctional crosslinker comprises a silylated multifunctional anhydride, and wherein the at least one of the epoxy functional silane and the diol functional organopolysiloxane is present in a molar ratio to the multifunctional crosslinker from about 10:1 to 1:10; and an amount of water sufficient to hydrolyze the epoxy functional silane, the diol functional organopolysiloxane, and the silylated multifunctional crosslinker.

In one example, the at least one of the epoxy functional silane and the diol functional organopolysiloxane is present in a molar ratio to the multifunctional crosslinker of about 2:1 to 1:2. In another example, the coating can be formed to a radius from about 1 inch to less than about 10 inches on a polycarbonate substrate. In a further example, the coating can be formed to a radius from about 3 inches to about 5 inches on a polycarbonate substrate.

In another example, the coating has a Taber number of less than about 10 percent after 50 revolutions of a Taber wheel or a Taber number of less than about 2 percent after 50 revolutions of a Taber wheel. In another example, the coating has a Taber number of less than about 45 percent after 200 revolutions of a Taber wheel or a Taber number of less than about 15 percent after 200 revolutions of a Taber wheel.

In one example, the at least one of the epoxy functional silane and the diol functional organopolysiloxane comprises about 5 to about 93 percent by weight of the solids of the composition, and the multifunctional crosslinker comprises about 7 to about 95 percent by weight of the solids of the composition. In another example, the at least one of the epoxy functional silane and the diol functional silane comprises about 30 to about 70 percent by weight of the solids of the composition, and the multifunctional crosslinker comprises about 30 to about 70 percent by weight of the solids of the composition. In a further example, the solvent constituent of the aqueous-organic solvent mixture comprises from about 40 to about 98 percent by weight of the composition. In yet another example, the solvent constituent of the aqueous-organic solvent mixture comprises from about 65 to about 95 percent by weight of the composition.

In one example, the solvent constituent of the aqueous-organic solvent mixture is selected from an ether, a glycol or a glycol ether, a ketone, an ester, a glycolether acetate, and combinations thereof. In another example, the solvent constituent of the aqueous-organic solvent mixture is selected from alcohols having the formula ROH where R is an alkyl group containing from 1 to about 10 carbon atoms. In another example, the solvent constituent of the aqueous-organic solvent mixture is selected from glycols, ethers, glycol ethers having the formula $R^1$—$(OR^2)_x$—$OR^1$ where x is 0, 1, 2, 3 or 4, $R^1$ is hydrogen or an alkyl group containing from 1 to about 10 carbon atoms and $R^2$ is an alkylene group containing from 1 to about 10 carbon atoms and combinations thereof.

In one example, the epoxy functional silane is represented by the formula $R^3_x Si(OR^4)_{4-x}$, wherein: x is an integer of 1, 2 or 3; $R^3$ is H, an alkyl group, a functionalized alkyl group, an alkylene group, an aryl group, an alkyl ether, and combinations thereof containing from 1 to about 10 carbon atoms and having at least 1 epoxy functional group; $R^4$ is H, an alkyl group containing from 1 to about 5 carbon atoms, an acetyl group, a —$Si(OR^5)_{3-y}R^6_y$ group where y is an integer of 0, 1, 2, or 3, and combinations thereof; $R^5$ is H, an alkyl group containing from 1 to about 5 carbon atoms, an acetyl group, or another —$Si(OR^5)_{3-y}R^6_y$ group and combinations thereof; and $R^6$ is H, an alkyl group, a functionalized alkyl group, an alkylene group, an aryl group, an alkyl ether, and combinations thereof containing from 1 to about 10 carbon atoms.

In one example, the aqueous-organic solvent mixture further comprises an effective amount of a leveling agent to spread the aqueous-organic solvent mixture on the substrate and provide a substantially uniform contact of the aqueous-organic solvent mixture with the substrate. In another example, the composition further comprises at least one catalyst, at least one ultraviolet stabilizer, or at least one surfactant, and combinations thereof.

In other embodiments of the present invention, compositions which, when applied to a substrate and cured, provide an abrasion resistant formable coating on the substrate are provided. The compositions can comprise an aqueous-organic solvent mixture having hydrolysis products and partial condensates of a diol functional organopolysiloxane and at least one multifunctional crosslinker, wherein the multifunctional crosslinker is selected from multifunctional carboxylic acids, multifunctional anhydrides, and silylated multifunctional anhydrides, and wherein the diol functional organopolysiloxane is present in a molar ratio to the multifunctional crosslinker of from about 10:1 to 1:10; and an amount of water sufficient to hydrolyze the diol functional organopolysiloxane and the silylated multifunctional crosslinker. In one example, the aqueous-organic solvent mixture further comprises hydrolysis products and partial condensates of an epoxy functional silane and the at least one multifunctional crosslinker.

In accordance with further embodiments of the present invention, compositions which, when applied to a substrate and cured, provide an abrasion resistant formable coating on the substrate are provided. The compositions can comprise an aqueous-organic solvent mixture having hydrolysis products and partial condensates of an epoxy functional silane and at least one multifunctional crosslinker, wherein the multifunctional crosslinker is selected from multifunctional carboxylic acids, multifunctional anhydrides, and silylated multifunctional anhydrides, and wherein the at least one epoxy functional silane is present in a molar ratio to the multifunctional crosslinker of from about 10:1 to 1:10; and an amount of water sufficient to hydrolyze the epoxy functional silane and the silylated multifunctional crosslinker, wherein the composition contains an amount of at least one of tetrafunctional silanes, disilanes, and alkyl silanes insufficient to render the coating rigid on the substrate. In one example, the aqueous-organic solvent mixture further comprises hydrolysis products and partial condensates of a diol functional organopolysiloxane and the multifunctional crosslinker.

In accordance with embodiments of the present invention, compositions which, when applied to a substrate and cured, provide an abrasion resistant formable coating on the substrate are provided. The compositions can comprise an aqueous-organic solvent mixture having hydrolysis products and partial condensates of an epoxy functional silane at and least one multifunctional crosslinker, wherein the multifunctional crosslinker is selected from multifunctional carboxylic acids, multifunctional anhydrides, and silylated multifunctional anhydrides, and wherein the epoxy functional silane is present in a molar ratio to the multifunctional crosslinker of from about 10:1 to about 1:10; an amount of water sufficient to hydrolyze the epoxy functional silane and the silylated multifunctional crosslinker; and at least one of a tetrafunctional silane and a disilane, wherein the epoxy functional silane is present in a molar ratio to the at least one of the tetrafunctional silane and the disilane of at least about 5.5:1. In one example, the aqueous-organic solvent mixture further comprises hydrolysis products and partial condensates of a diol functional organopolysiloxane and the multifunctional crosslinker.

In another example, the tetrafunctional silane has a formula of $Si(OR^9)_4$, where $R^9$ is H, an alkyl group containing from 1 to about 5 carbon atoms and ethers thereof, an $(OR^9)$ carboxylate, a $-Si(OR^{10})_3$ group where $R^{10}$ is a H, an alkyl group containing from 1 to about 5 carbon atoms and ethers thereof, an $(OR^{10})$ carboxylate, or another $-Si(OR^{10})_3$ group and combinations thereof. In a further example, the disilane has a formula of $(R^{11}O)_x R^{12}_{3-x}Si-R^{13}_y-SiR^{14}_{3-x}(OR^{15})_x$; wherein x is 0, 1, 2, or 3 and y is 0 or 1; wherein $R^{12}$ and $R^{14}$ comprises H, an alkyl group containing from about 1 to about 10 carbon atoms, a functionalized alkyl group, an alkylene group, an aryl group, an alkypolyether group, and combinations thereof; wherein $R^{11}$ and $R^{15}$ comprises H, an alkyl group containing from about 1 to about 10 carbon atoms, an acetyl group, and combinations thereof; wherein if y is 1 then $R^{13}$ comprises an alkylene group containing from about 1 to about 12 carbon atoms, an alkylenepolyether containing from about 1 to about 12 carbon atoms, an aryl group, an alkylene substituted aryl group, an alkylene group which may contain one or more olefins, S, or O; wherein if x is 0 then $R^{12}$ and $R^{14}$ comprises Cl or Br; and wherein if y is 0 then there is a direct silicon-silicon bond.

In accordance with embodiments of the present invention compositions which, when applied to a substrate and cured, provide an abrasion resistant formable coating on the substrate are provided. The compositions can comprise an aqueous-organic solvent mixture having hydrolysis products and partial condensates of an epoxy functional silane at least one multifunctional crosslinker, wherein the multifunctional crosslinker is selected from multifunctional carboxylic acids, multifunctional anhydrides, and silylated multifunctional anhydrides, and wherein the epoxy functional silane is present in a molar ratio to the multifunctional crosslinker of from about 10:1 to about 1:10; an amount of water sufficient to hydrolyze the epoxy functional silane and the silylated multifunctional crosslinker; and at least one alkyl silane, wherein the epoxy functional silane is present in a molar ratio to the at least one alkyl silane of at least about 2.5:1.

In one example, the aqueous-organic solvent mixture further comprises hydrolysis products and partial condensates of a diol functional organopolysiloxane and the multifunctional crosslinker. In another example, the alkyl silane has a formula of $R^{16}_x Si(OR^{17})_{4-x}$ where x is a number of 1, 2 or 3; $R^{16}$ is H, or an alkyl group containing from 1 to about 10 carbon atoms, a functionalized alkyl group, an alkylene group, an aryl group an alkoxypolyether group and combinations thereof; $R^{17}$ is H, an alkyl group containing from 1 to about 10 carbon atoms, an acetyl group; and combinations thereof.

In accordance with other embodiments of the present invention, compositions which, when applied to a substrate and cured, provide an abrasion resistant and formable coating on the substrate are provided. The compositions can comprise an aqueous-organic solvent mixture having hydrolysis products and partial condensates of at least one epoxy functional silane and at least one multifunctional crosslinker, wherein the multifunctional crosslinker is selected from multifunctional carboxylic acids, multifunctional anhydrides, and silylated multifunctional anhydrides, and wherein the at least one epoxy functional silane is present in a molar ratio to the multifunctional crosslinker from about 10:1 to 1:10; and an amount of water sufficient to hydrolyze the epoxy functional silane and the silylated multifunctional crosslinker, wherein the composition does not contain tetrafunctional silanes, disilanes, and alkyl silanes. In one example, the aqueous-organic solvent mixture further comprises hydrolysis products and partial condensates of a diol functional organopolysiloxane and the multifunctional crosslinker.

In accordance with embodiments of the present invention, articles are provided. The articles can comprise a substrate and an abrasion resistant formable coating present on at least one surface of the substrate by curing a coating composition, comprising: an aqueous-organic solvent mixture having hydrolysis products and partial condensates of at least one of an epoxy functional silane and a diol functional organopolysiloxane and at least one multifunctional crosslinker, wherein the multifunctional crosslinker comprises a silylated multifunctional anhydride, and wherein the at least one of the epoxy functional silane and the diol functional organopolysiloxane is present in a molar ratio to the multifunctional crosslinker from about 10:1 to 1:10; and an amount of water sufficient to hydrolyze the epoxy functional silane, the diol functional organopolysiloxane, and the silylated multifunctional crosslinker. In one example, at least one primer disposed on the at least one surface of the substrate between the substrate and the coating.

In accordance with further embodiments of the present invention, articles are provided. The articles can comprise a substrate and an abrasion resistant formable coating present on at least one surface of the substrate by curing a coating composition, comprising: an aqueous-organic solvent mixture having hydrolysis products and partial condensates of a diol functional organopolysiloxane and at least one multifunctional crosslinker, wherein the multifunctional crosslinker is selected from multifunctional carboxylic acids, multifunctional anhydrides, and silylated multifunctional anhydrides, and wherein the at least one diol functional organopolysiloxane is present in a molar ratio to the multifunctional crosslinker of from about 10:1 to 1:10; and an amount of water sufficient to hydrolyze the diol functional organopolysiloxane and the silylated multifunctional crosslinker.

In accordance with other embodiments of the present invention, articles are provided. The articles can comprise a substrate and an abrasion resistant formable coating present on at least one surface of the substrate by curing a coating composition, comprising: an aqueous-organic solvent mixture having hydrolysis products and partial condensates of an epoxy functional silane and at least one multifunctional crosslinker, wherein the multifunctional crosslinker is selected from multifunctional carboxylic acids, multifunctional anhydrides, and silylated multifunctional anhydrides, and wherein the at least one epoxy functional silane is present in a molar ratio to the multifunctional crosslinker of from about 10:1 to 1:10; and an amount of water sufficient to hydrolyze the epoxy functional silane and the silylated multifunctional crosslinker, wherein the composition contains an amount of at least one of tetrafunctional silanes, disilanes, and alkyl silanes insufficient to render the coating rigid on the substrate.

In accordance with embodiments of the present invention, articles are provided. The articles can comprise a substrate and an abrasion resistant formable coating present on at least one surface of the substrate by curing a coating composition, comprising: an aqueous-organic solvent mixture having hydrolysis products and partial condensates of an epoxy functional silane at least one multifunctional crosslinker, wherein the multifunctional crosslinker is selected from multifunctional carboxylic acids, multifunctional anhydrides, and silylated multifunctional anhydrides, and wherein the epoxy functional silane is present in a molar ratio to the multifunctional crosslinker of from about 10:1 to about 1:10; an amount of water sufficient to hydrolyze the epoxy functional silane and the silylated multifunctional crosslinker; and at least one of a tetrafunctional silane and a disilane, wherein the epoxy functional silane is present in a molar ratio to the at least one of the tetrafunctional silane and the disilane of at least about 5.5:1.

In accordance with further embodiments of the present invention, articles are provided. The articles can comprise a substrate and an abrasion resistant formable coating present on at least one surface of the substrate by curing a coating composition, comprising: an aqueous-organic solvent mixture having hydrolysis products and partial condensates of an epoxy functional silane at least one multifunctional crosslinker, wherein the multifunctional crosslinker is selected from multifunctional carboxylic acids, multifunctional anhydrides, and silylated multifunctional anhydrides, and wherein the epoxy functional silane is present in a molar ratio to the multifunctional crosslinker of from about 10:1 to about 1:10; an amount of water sufficient to hydrolyze the epoxy functional silane and the silylated multifunctional crosslinker; and at least one alkyl silane, wherein the epoxy functional silane is present in a molar ratio to the at least one alkyl silane of at least about 2.5:1.

In accordance with embodiments of the present invention, articles are provided. The articles can comprise a substrate and an abrasion resistant formable coating present on at least one surface of the substrate by curing a coating composition, comprising: an aqueous-organic solvent mixture having hydrolysis products and partial condensates of at least one epoxy functional silane and at least one multifunctional crosslinker, wherein the multifunctional crosslinker is selected from multifunctional carboxylic acids, multifunctional anhydrides, and silylated multifunctional anhydrides, and wherein the at least one epoxy functional silane is present in a molar ratio to the multifunctional crosslinker from about 10:1 to 1:10; and an amount of water sufficient to hydrolyze the epoxy functional silane and the silylated multifunctional crosslinker, wherein the composition does not contain tetrafunctional silanes, disilanes, and alkyl silanes.

In accordance with embodiments of the present invention, formed articles are provided. The articles can comprise a formed substrate and an abrasion resistant formable coating present on at least one surface of the substrate by applying a coating composition, curing the coating composition, and subsequently forming the substrate, wherein the coating composition comprises: an aqueous-organic solvent mixture having hydrolysis products and partial condensates of at least one of an epoxy functional silane and a diol functional organopolysiloxane and at least one multifunctional crosslinker, wherein the multifunctional crosslinker comprises a silylated multifunctional anhydride, and wherein the at least one of the epoxy functional silane and the diol functional organopolysiloxane is present in a molar ratio to the multifunctional crosslinker from about 10:1 to 1:10; and an amount of water sufficient to hydrolyze the epoxy functional silane, the diol functional organopolysiloxane, and the silylated multifunctional crosslinker. In one example, the formed article further comprises at least one primer disposed on the at least one surface of the substrate between the substrate and the coating.

In accordance with further embodiments of the present invention, formed articles are provided. The formed articles can comprise a formed substrate and an abrasion resistant formable coating present on at least one surface of the substrate by applying a coating composition, curing the coating composition, and subsequently forming the substrate, wherein the coating composition comprises: an aqueous-organic solvent mixture having hydrolysis products and partial condensates of a diol functional organopolysiloxane and at least one multifunctional crosslinker, wherein the multifunctional crosslinker is selected from multifunctional carboxylic acids, multifunctional anhydrides, and silylated multifunctional anhydrides, and wherein the at least one diol functional organopolysiloxane is present in a molar ratio to the multifunctional crosslinker of from about 10:1 to 1:10; and an amount of water sufficient to hydrolyze the diol functional organopolysiloxane and the silylated multifunctional crosslinker.

In accordance with other embodiments of the present invention, formed articles are provided. The formed articles can comprise a formed substrate and an abrasion resistant formable coating present on at least one surface of the substrate by applying a coating composition, curing the coating composition, and subsequently forming the substrate, wherein the coating composition comprises: an aqueous-organic solvent mixture having hydrolysis products and partial condensates of an epoxy functional silane and at least one multifunctional crosslinker, wherein the multifunctional crosslinker is selected from multifunctional carboxylic acids, multifunctional anhydrides, and silylated multifunctional anhydrides, and wherein the at least one epoxy functional silane is present in a molar ratio to the multifunctional crosslinker of from about 10:1 to 1:10; and an amount of water sufficient to hydrolyze the epoxy functional silane and the silylated multifunctional crosslinker, wherein the composition contains an amount of at least one of tetrafunctional silanes, disilanes, and alkyl silanes insufficient to render the coating rigid on the substrate.

In accordance with embodiments of the present invention, formed articles are provided. The articles can comprise a formed substrate and an abrasion resistant formable coating present on at least one surface of the substrate by applying a coating composition, curing the coating composition, and subsequently forming the substrate, wherein the coating composition comprises: an aqueous-organic solvent mixture having hydrolysis products and partial condensates of an epoxy functional silane at least one multifunctional crosslinker, wherein the multifunctional crosslinker is selected from multifunctional carboxylic acids, multifunctional anhydrides, and silylated multifunctional anhydrides, and wherein the epoxy functional silane is present in a molar ratio to the multifunctional crosslinker of from about 10:1 to about 1:10; an amount of water sufficient to hydrolyze the epoxy functional silane and the silylated multifunctional crosslinker; and at least one of a tetrafunctional silane and a disilane, wherein the epoxy functional silane is present in a molar ratio to the at least one of the tetrafunctional silane and the disilane of at least about 5.5:1.

In accordance with other embodiments of the present invention, formed articles are provided. The formed articles comprise a formed substrate and an abrasion resistant formable coating present on at least one surface of the substrate by applying a coating composition, curing the coating composition, and subsequently forming the substrate, wherein the coating composition comprises: an aqueous-organic solvent mixture having hydrolysis products and partial condensates of an epoxy functional silane at least one multifunctional crosslinker, wherein the multifunctional crosslinker is selected from multifunctional carboxylic acids, multifunctional anhydrides, and silylated multifunctional anhydrides, and wherein the epoxy functional silane is present in a molar ratio to the multifunctional crosslinker of from about 10:1 to about 1:10; an amount of water sufficient to hydrolyze the epoxy functional silane and the silylated multifunctional crosslinker; and at least one alkyl silane, wherein the epoxy functional silane is present in a molar ratio to the at least one alkyl silane of at least about 2.5:1.

In accordance with embodiments of the present invention, formed articles are provided. The formed articles can comprise a formed substrate and an abrasion resistant formable coating present on at least one surface of the substrate by applying a coating composition, curing the coating composition, and subsequently forming the substrate, wherein the coating composition comprises: an aqueous-organic solvent mixture having hydrolysis products and partial condensates of at least one epoxy functional silane and at least one multifunctional crosslinker, wherein the multifunctional crosslinker is selected from multifunctional carboxylic acids, multifunctional anhydrides, and silylated multifunctional anhydrides, and wherein the at least one epoxy functional silane is present in a molar ratio to the multifunctional crosslinker from about 10:1 to 1:10; and an amount of water sufficient to hydrolyze the epoxy functional silane and the silylated multifunctional crosslinker, wherein the composition does not contain tetrafunctional silanes, disilanes, and alkyl silanes.

In accordance with embodiments of the present invention processes for providing abrasion resistant formable coatings are provided. The processes can comprise applying a coating composition to a substrate; and curing the coating composition, wherein the coating composition comprises: an aqueous-organic solvent mixture having hydrolysis products and partial condensates of at least one of an epoxy functional silane and a diol functional organopolysiloxane and at least one multifunctional crosslinker, wherein the multifunctional crosslinker comprises a silylated multifunctional anhydride, and wherein the at least one of the epoxy functional silane and the diol functional organopolysiloxane is present in a molar ratio to the multifunctional crosslinker from about 10:1 to 1:10; and an amount of water sufficient to hydrolyze the epoxy functional silane, the diol functional organopolysiloxane, and the silylated multifunctional crosslinker. In one example, the process further comprises the step of forming the coated substrate. In another example, the process further comprises applying a primer to the substrate prior to applying the coating composition to the substrate on the primer.

In accordance with embodiments of the present invention, processes for providing an abrasion resistant formable coatings are provided. The processes comprise applying a coating composition to a substrate; and curing the coating composition, wherein the coating composition comprises: an aqueous-organic solvent mixture having hydrolysis products and partial condensates of a diol functional organopolysiloxane and at least one multifunctional crosslinker, wherein the multifunctional crosslinker is selected from multifunctional carboxylic acids, multifunctional anhydrides, and silylated multifunctional anhydrides, and wherein the at least one diol functional organopolysiloxane is present in a molar ratio to the multifunctional crosslinker of from about 10:1 to 1:10; and an amount of water sufficient to hydrolyze the diol functional organopolysiloxane and the silylated multifunctional crosslinker.

In accordance with embodiments of the present invention, processes for providing an abrasion resistant formable coatings are provided. The processes can comprise applying a coating composition to a substrate; and curing the coating composition, wherein the coating composition comprises: an aqueous-organic solvent mixture having hydrolysis products and partial condensates of an epoxy functional silane and at least one multifunctional crosslinker, wherein the multifunctional crosslinker is selected from multifunctional carboxylic acids, multifunctional anhydrides, and silylated multifunctional anhydrides, and wherein the at least one epoxy functional silane is present in a molar ratio to the multifunctional crosslinker of from about 10:1 to 1:10; and an amount of water sufficient to hydrolyze the epoxy functional silane and the silylated multifunctional crosslinker, wherein the composition contains an amount of at least on of tetrafunctional silanes, disilanes, and alkyl silanes insufficient to render the coating rigid on the substrate.

In accordance with embodiments of the present invention, processes for providing an abrasion resistant formable coatings are provided. The processes comprise applying a coating composition to a substrate; and curing the coating composition, wherein the coating composition comprises: an aqueous-organic solvent mixture having hydrolysis products and partial condensates of an epoxy functional silane at least one multifunctional crosslinker, wherein the multifunctional crosslinker is selected from multifunctional carboxylic acids, multifunctional anhydrides, and silylated multifunctional anhydrides, and wherein the epoxy functional silane is present in a molar ratio to the multifunctional crosslinker of from about 10:1 to about 1:10; an amount of water sufficient to hydrolyze the epoxy functional silane and the silylated multifunctional crosslinker; and at least one of a tetrafunctional silane and a disilane, wherein the epoxy functional silane is present in a molar ratio to the at least one of the tetrafunctional silane and the disilane of at least about 5.5:1.

In accordance with embodiments of the present invention, processes for providing an abrasion resistant formable coatings are provided. The processes comprise applying a coating composition to a substrate; and curing the coating composition, wherein the coating composition comprises: an aqueous-organic solvent mixture having hydrolysis products and partial condensates of an epoxy functional silane at least one multifunctional crosslinker, wherein the multifunctional crosslinker is selected from multifunctional carboxylic acids, multifunctional anhydrides, and silylated multifunctional anhydrides, and wherein the epoxy functional silane is present in a molar ratio to the multifunctional crosslinker of from about 10:1 to about 1:10; an amount of water sufficient to hydrolyze the epoxy functional silane and the silylated multifunctional crosslinker; and at least one alkyl silane, wherein the epoxy functional silane is present in a molar ratio to the at least one alkyl silane of at least about 2.5:1.

In accordance with embodiments of the present invention, processes for providing an abrasion resistant formable coatings are provided. The processes comprise applying a coating composition to a substrate; and curing the coating composition, wherein the coating composition comprises: an aqueous-organic solvent mixture having hydrolysis products and partial condensates of at least one epoxy functional silane and at least one multifunctional crosslinker, wherein the multifunctional crosslinker is selected from multifunctional carboxylic acids, multifunctional anhydrides, and silylated multifunctional anhydrides, and wherein the at least one epoxy functional silane is present in a molar ratio to the multifunctional crosslinker from about 10:1 to 1:10; and an amount of water sufficient to hydrolyze the epoxy functional silane and the silylated multifunctional crosslinker, wherein the composition does not contain tetrafunctional silanes, disilanes, and alkyl silanes.

It will be understood that various changes may be made without departing from the scope of the invention, which is not to be considered limited to what is described in the description.

DETAILED DESCRIPTION OF EMBODIMENTS OF THE INVENTION

The present invention will now be described with occasional reference to specific embodiments of the invention. This invention may, however, be embodied in different forms and should not be construed as limited to the embodiments set forth herein. Rather, these embodiments are provided so that this disclosure will be thorough and complete.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are incorporated by reference in their entirety.

Unless otherwise indicated, all numbers expressing quantities of ingredients, properties such as molecular weight, reaction conditions, and so forth as used in the description and claims are to be understood as being modified in all instances by the term "about." Accordingly, unless otherwise indicated, the numerical properties set forth in the following description and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The present invention relates to stable coating compositions which, when applied to a variety of substrates and cured, form abrasion resistant, formable coatings. For purposes of defining and describing the present invention, the term "stable" shall be understood as referring to coating compositions that are useable for an amount of time suitable for a particular application. In addition, the present invention relates to coated articles, formed coated articles, and methods of forming coated articles. The coated articles can be formed in any suitable manner. For example, the coated articles can be thermoformed. "Thermoforming" is a well known term in the plastics art describing the process of shaping thermoplastic sheets by heating them until softened, then forming the softened sheets into desired shapes using any suitable procedure such as molding, jigging, or vacuum forming.

In accordance with embodiments of the present invention, a stable coating composition that forms an abrasion resistant, formable coating is provided. The coating composition is cured to form a transparent coating on a substrate. The coating composition comprises an aqueous-organic solvent mixture having hydrolysis products and partial condensates of at least one of at least one epoxy functional silane and at least one diol functional organopolysiloxane, or combinations thereof and at least one multifunctional crosslinker to form a cured organopolysiloxane coating on a substrate. The at least one of the epoxy functional silane and the diol functional organopolysiloxane is present in a molar ratio to the multifunctional crosslinker of between about 10:1 to about 1:10. In one example, the at least one of the epoxy functional silane and the diol functional organopolysiloxane can be present in a molar ratio to the multifunctional crosslinker of about 2:1 to about 1:2.

In one example, the multifunctional crosslinker is selected from multifunctional carboxylic acids, multifunctional anyhydrides, silylated multifunctional carboxylic acids, and silylated multifunctional anyhydrides, and combinations thereof.

In another example, the multifunctional crosslinker is at least one silylated multifunctional anhydride or at least one silylated multifunctional carboxylic acid. The coating composition also contains an amount of water sufficient to hydrolyze the at least one of the epoxy functional silane and the diol functional organopolysiloxane and the silylated multifunctional crosslinker.

The solvent component of the aqueous-organic solvent mixture can be present in any suitable amount. For example, the solvent component of the aqueous-organic solvent mixture comprises about 40 to about 98 percent of the coating composition by weight. In another example, the solvent component of the aqueous-organic solvent mixture comprises about 65 to about 95 percent of the coating composition by weight. It will be understood by those having skill in the art that at least a part of the solvent component of the aqueous-organic solvent mixture can be formed as hydrolysis by-products of the reactions of the coating compositions. The at least one of the epoxy functional silane and diol functional organopolysiloxane can be present in any suitable amount. For example, the at least one of the epoxy functional silane and diol functional organopolysiloxane comprises about 5 to about 93 percent by weight of the total solids of the composition. In another example, the at least one of the epoxy functional silane and diol functional organopolysiloxane comprises about 30 to about 70 percent by weight of the total solids of the coating composition. The multifunctional crosslinker can be present in any suitable amount. In one example, the multifunctional crosslinker comprises about 7 to about 95 percent by weight of the total solids of the composition. In another example, the multifunctional crosslinker comprises about 30 to about 70 percent by weight of the total solids of the coating composition.

In another embodiment of the present invention, the coating composition may include tetrafunctional silanes, disilanes, or other alkyl silanes that are not epoxy functional. However, the tetrafunctional silanes, disilanes, and other alkyl silanes are present in amounts insufficient to render the cured coating rigid. For purposes of defining and describing the present invention, the term "rigid" shall be understood as referring to coatings that are not formable as defined herein. In one example, the coating composition has a molar ratio of the at least one epoxy functional silane to tetrafunctional silane of at least about 5.5:1. In a further example, the coating composition has a molar ratio of the at least one epoxy functional silane to disilane of at least about 5.5:1. In another example, the coating composition has a molar ratio of the at least one epoxy functional silane to alkyl silane of at least about 2.5:1. The amount of tetrafunctional silanes, disilanes, and other alkyl silanes that are not epoxy functional that are incorporated into the coating compositions of the present invention can vary widely and will generally depend on the desired properties of the cured coating produced from the coating compositions, as well as the desired stability of the coating compositions. The tetrafunctional silanes, disilanes, and the alkyl silanes that are not epoxy functional can improve abrasion resistance, chemical resistance, and the optical properties of the cured coatings. In other embodiments of the present invention, the coating composition may include other additives such as anti-fog components, leveling agents, catalysts, etc., as will be further described herein.

For testing abrasion resistance of coated substrates, any of a number of quantitative test methods may be employed, including the Taber Test (ASTM D-4060), the Tumble Test, and the Oscillating Sand Test (ASTM F735-81). In addition, there are a number of qualitative test methods that may be used for measuring abrasion resistance, including the Steel Wool Test and the Eraser Test. In the Steel Wool Test and the Eraser Test, sample coated substrates are scratched under reproducible conditions (constant load, frequency, etc.). The scratched test samples are then compared and rated against standard samples. A semi-quantitative application of these test methods involves the use of an instrument, such as a Spectrophotometer or a Colorimeter, for measuring the scratches on the coated substrate as a haze gain.

The measured abrasion resistance of a cured coating on a substrate, whether measured by the Taber Test, Steel Wool Test, Eraser Test, Tumble Test, etc. is a function, in part, of the cure temperature and cure time. In general, higher temperatures and longer cure times result in higher measured abrasion resistance. Normally, the cure temperature and cure time are selected for compatibility with the substrate. However, sometimes less than optimum cure temperatures and cure times are used due to process and/or equipment limitations. It will be recognized by those skilled in the art that other variables, such as coating thickness and the nature of the substrate, will also have an effect on the measured abrasion resistance. In general, for each type of substrate and for each coating composition there will be an optimum coating thickness. The optimum cure temperature, cure time, coating thickness, and the like, can be readily determined empirically by those skilled in the art.

The Taber Abrasion test is performed with a Teledyne Model 5150 Taber Abrader (Taber Industries, North Tonawanda, N.Y.) with a 500 g auxiliary load weight and with CS-10F wheels (Taber Industries, North Tonawanda, N.Y.). Prior to the measurement, the wheels are refaced with the ST-11 refacing stone (Taber Industries, North Tonawanda, N.Y.). The refacing is performed by 25 revolutions of the CS-10F wheels on the refacing stone. The initial haze of the sample is recorded 4 times with a Haze-gard Plus (BYK-Gardner, Columbia, Md.) equipped with a Taber Abrasion holder (BYK-Gardner, Columbia, Md.). After 50 cycles of the CS-10F wheels on the sample, the haze is recorded again 4 times with a Haze-gard Plus (BYK-Gardner, Columbia, Md.) equipped with a Taber Abrasion holder (BYK-Gardner, Columbia, Md.). The average haze is then determined for the initial haze reading, the haze reading after 50 cycles, and after 200 cycles using the new CS-10F wheels available at least as early as July 2003. The difference between the averaged haze readings at 50 and 200 cycles and the initial haze reading is then reported.

The Taber method is considered a semi-quantitative method for measuring abrasion resistance. The precision and accuracy of the method is dependent on a number of factors, including the condition of the CS-10F test wheels. Changes in the condition of the CS-10F test wheels can have a significant affect on the outcome of an abrasion resistance test. For example, a recent change made by Taber Industries in the composition of the CS-10F. wheels changed the haze gain on standard samples from 1% haze and 5% haze at 100 and 500 cycles (reported as 1%/5%) respectively, to 7% and 25%, respectively. Throughout the testing conducted herein, all of the samples were tested with the same set of new CS-10F Taber wheels. In accordance with embodiments of the present invention, the coatings can have Taber numbers of less than about 30%, less than about 10%, or less than about 5% for 50 cycles. In accordance with other embodiments of the present invention, the coatings can have Taber numbers of less than about 2% for 50 cycles. In other examples, the coatings can have Taber numbers of less than about 45%, less than about 30%, or less than about 15% for 200 cycles.

The formability of the coatings can be tested in the following manner. An oven with a glass plate is preheated to 165° C.

A 2"×7" coated ¼" Lexan polycarbonate (¼" Lexan PC, Regal Plastics, Santa Fe Springs, Calif.) test sample is placed flat on the glass plate and heated at 165° C. for 18 min. The thickness of the coating can be from about 1-20 microns or about 2-10 microns. The sample is removed from the oven and immediately placed on a cylindrical mandrel. The formability of the sample is rated by determining the minimal radius of the mandrel where no cracking, flaking, or detachment of the coating is observed. For purposes of defining and describing the present invention, the terms "formable" and "formability" shall be understood as referring to cured coatings that can be bent at a radius of less than about 10 inches, in accordance with the above procedure. In one example, the cured coatings can be bent at a radius of between about 3 to about 5 inches in accordance with the above procedure without cracking or crazing of the coating.

The presence of water in an aqueous-organic solvent mixture is needed to form hydrolysis products of the silane components of the mixture. The actual amount of water can vary widely. Enough water is needed to provide a suitably homogeneous coating mixture of hydrolysis products and partial condensates of the silane components of the coating composition with the other added components. It will be recognized by those skilled in the art that this amount of water can be determined empirically.

The solvent constituent of the aqueous-organic solvent mixture of the coating compositions of the present invention can be any solvent or combination of solvents which are compatible with the components of the coating composition including, but not limited to, an epoxy functional silane, diol functional organopolysiloxane, a silane which is not epoxy functional, a tetrafunctional silane, a disilane, and a multifunctional crosslinker, or any combinations thereof. For example, the solvent constituent of the aqueous-organic solvent mixture may be water, an alcohol, an ether, a glycol or a glycol ether, a ketone, an ester, a glycolether acetate, and combinations thereof. Suitable alcohols can be represented by the formula ROH where R is an alkyl group containing from 1 to about 10 carbon atoms. Some examples of alcohols useful in the application of this invention are methanol, ethanol, propanol, isopropanol, butanol, isobutanol, secondary butanol, tertiary butanol, cyclohexanol, pentanol, octanol, decanol, and mixtures thereof.

Suitable glycols, ethers, glycol ethers can be represented by the formula $R^1$—$(OR^2)_xOR^1$ where x is 0, 1, 2, 3 or 4, $R^1$ is hydrogen or an alkyl group containing from 1 to about 10 carbon atoms and $R^2$ is an alkylene group containing from 1 to about 10 carbon atoms and combinations thereof.

Examples of glycols, ethers and glycol ethers having the above defined formula include, but are not limited to, di-n-butylether, ethylene glycol dimethyl ether, propylene glycol dimethyl ether, propylene glycol methyl ether, dipropylene glycol methyl ether, tripropylene glycol methyl ether, dipropylene glycol dimethyl ether, tripropylene glycol dimethyl ether, ethylene glycol butyl ether, diethylene glycol butyl ether, ethylene glycol dibutyl ether, ethylene glycol methyl ether, diethylene glycol ethyl ether, diethylene glycol dimethyl ether, ethylene glycol ethyl ether, ethylene glycol diethyl ether, ethylene glycol, diethylene glycol, diethylene glycol, propylene glycol, dipropylene glycol, tripropylene glycol, butylene glycol, dibutylene glycol, tributylene glycol and combinations thereof. In addition to the above, cyclic ethers such as tetrahydrofuran and dioxane are suitable ethers for the aqueous-organic solvent mixture.

Examples of ketones suitable for the aqueous-organic solvent mixture include, but are not limited to, acetone, diacetone alcohol, methyl ethyl ketone, cyclohexanone, methyl isobutyl ketone and combinations thereof. Examples of esters suitable for the aqueous-organic solvent mixture include, but are not limited to, ethyl acetate, n-propyl acetate, n-butyl acetate and combinations thereof. Examples of glycolether acetates suitable for the aqueous-organic solvent mixture include, but are not limited to, propylene glycol methyl ether acetate, dipropylene glycol methyl ether acetate, ethyl 3-ethoxyproprionate, ethylene glycol ethyl ether acetate and combinations thereof.

Any suitable epoxy functional silane, diol functional organopolysiloxane from a hydrolyzed epoxy functional silane, or combinations thereof can be used in the coating compositions of the present invention. For example, the epoxy functional silane or diol functional organopolysiloxane can be any epoxy functional silane or diol functional organopolysiloxane which is compatible with the multifunctional carboxylic acid. For example, such epoxy functional silanes are represented by the formula $R^3_xSi(OR^4)_{4-x}$ where x is an integer of 1, 2 or 3, $R^3$ is H, an alkyl group, a functionalized alkyl group, an alkylene group, an aryl group, an alkyl ether, and combinations thereof containing from 1 to about 10 carbon atoms and having at least 1 epoxy functional group, and $R^4$ is H, an alkyl group containing from 1 to about 5 carbon atoms, an acetyl group, a —$Si(OR^5)_{3-y}R^6_y$ group where y is an integer of 0, 1, 2, or 3, and combinations thereof where $R^5$ is H, an alkyl group containing from 1 to about 5 carbon atoms, an acetyl group, or another —$Si(OR^5)_{3-y}R^6_y$ group and combinations thereof, and $R^6$ is H, an alkyl group, a functionalized alkyl group, an alkylene group, an aryl group, an alkyl ether, and combinations thereof containing from 1 to about 10 carbon atoms which may also contain an epoxy functional group.

In another example, the diol functional organopolysiloxane is the product of a ring-opening reaction of epoxy functional silane with water. The ring-opening reaction is accompanied by hydrolysis and condensation of the alkoxy groups. Such a ring-opening reaction is graphically shown as:

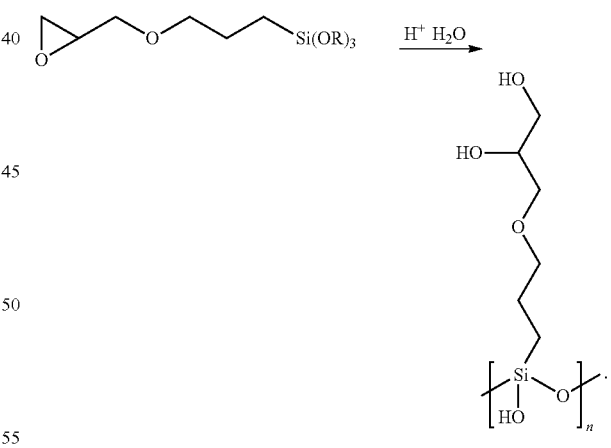

where R is any suitable group. In another example, a commercial source of a diol functional organopolysiloxane, HS2926, can be obtained from DEGUSSA Corp. (Piscataway, N.J.). The HS2926 can be used "as-is" without further purification. Diol functional organopolysiloxanes can be prepared by mixing an epoxy functional silane with an excess of water that is adjusted to a pH of three with acid and refluxed for several hours. The alcohol that forms during the hydrolysis of the alkoxysilane groups can be removed by distillation.

Examples of suitable epoxy functional silanes include, but are not limited to, glycidoxymethyltrimethoxysilane, 3-glycidoxypropyltrihydroxysilane, 3-glycidoxypropyl dimethylhydroxysilane, 3-glycidoxypropyltrimethoxysilane, 3-glycidoxypropyltriethoxysilane, 3-glycidoxypropyldimethoxymethylsilane, 3-glycidoxypropyldimethylmethoxysilane, 3-glycidoxypropyltributoxysilane, 1,3-bis(glycidoxypropyl)tetramethyldisiloxane, 1,3-bis(glycidoxypropyl)tetramethoxydisiloxane, 1,3-bis(glycidoxypropyl)-1,3-dimethyl-1,3-dimethoxydisiloxane, 2,3-epoxypropyltrimethoxysilane, 3,4-cpoxybutyltrimethoxysilane, 6,7-epoxyheptyltrimethoxysilane, 9,10-epoxydecyltrimethoxysilane, 1,3-bis(2,3-epoxypropyl)tetramethoxydisiloxane, 1,3-bis(6,7-epoxy-heptyl)tetramethoxydisiloxane, 2-(3,4-epoxycyclohexyl)ethyltrimethoxysilane, and the like.

Any suitable multifunctional crosslinker or combinations of multifunctional crosslinkers can be used in the present invention. The multifunctional crosslinker can be any multifunctional carboxylic acid, multifunctional anhydride, silylated multifunctional anhydride, silylated multifunctional carboxylic acid, and combinations thereof which are compatible with epoxy functional silanes, diol functional organopolysiloxanes, or other components of the coating compositions. Silylated multifunctional anhydrides and carboxylic acids have —Si(OR') groups that are capable of interacting with the hydrolysis products and partial condensates of epoxy functional silanes, diol functional organopolysiloxanes, tetrafunctional silanes, disilanes, and allyl silanes.

The multifunctional crosslinker can include, but is not limited to, multifunctional carboxylic acids as well as anhydrides which produce multifunctional carboxylic acids. The carboxylic acid functional compound can be represented by the formula $R^7(COOR^8)_x$, where x is an integer of 1, 2, 3, or 4, and where $R^7$ is selected from the group consisting of H, an alkyl group, a functionalized alkyl group, an alkylene group, an aryl group, a functionalized aryl group, an alkyl ether, and combinations thereof wherein each of the alkyl group, the alkylene group, the aryl group, the functionalized alkyl group, and the alkyl ether are further characterized as containing from 1 to about 10 carbon atoms, and where $R^8$ is selected from the group consisting of H, a formyl group, a carbonyl group, or an acyl group, where the acyl group can be functionalized with an alkyl group, a functionalized alkyl group, an alkylene group, an aryl group, a functionalized aryl group, an alkyl ether, and combinations thereof wherein each of the alkyl group, the functionalized alkyl group, the alkylene group, the aryl group, the functionalized aryl group, and the alkyl ether are further characterized as containing from 1 to about 10 carbon atoms.

Examples of multifunctional carboxylic acids which can be employed in the preparation of the coating compositions of the present invention include, but are not limited to, malic acid, aconitic acid (cis,trans), itaconic acid, succinic acid, malonic acid, glutaric acid, adipic acid, pimelic acid, suberic acid, azelaic acid, sebacic acid, cyclohexyl succinic acid, 1,3,5 benzene tricarboxylic acid, 1,2,4,5 benzene tetracarboxylic acid, 1,4-cyclohexanedicarboxylic acid, 1,3-cyclohexanedicarboxylic acid, 1,1-cyclohexanediacetic acid, 1,3-cyclohexanedicarboxylic acid, 1,1-cyclohexanediacetic acid, 1,3-cycloheanediacetic acid, 1,3,5-cyclohexanetricarboxylic acid and unsaturated dibasic acids such as fumaric acid and maleic acid and combinations thereof.

Examples of multifunctional anhydrides which can be used in the coating compositions of the present invention include, but are not limited to, the anhydrides of the above mentioned carboxylic acids such as the cyclic anhydrides of the above mentioned dibasic acids such as succinic anhydride, itaconic anhydride, glutaric anhydride, trimellitic anhydride, pyromellitic anhydride, phthalic anhydride, maleic anhydride, and combinations thereof.

The multifunctional crosslinker can also include, but is not limited to, a carboxylic acid or acid anhydride which contains a —Si(OR') group. An example of such a material is 3-triethoxysilylpropylsuccinic anhydride.

Optionally, in addition to the multifunctional crosslinker of the coating composition, a mineral acid such as, for example, hydrochloric acid or nitric acid, can be used as a co-hydrolysis catalyst for the hydrolysis of the silane compounds described herein.

Any suitable tetrafunctional silane or combination of tetrafunctional silanes can be used in the present invention in amounts insufficient to render the coatings rigid. For example, the tetrafunctional silane can have formulas of $Si(OR^9)_4$, where $R^9$ is H, an alkyl group containing from 1 to about 5 carbon atoms and ethers thereof, a —$Si(OR^{10})_3$ group where $R^{10}$ is a H, an alkyl group containing from 1 to about 5 carbon atoms and ethers thereof, or another —$Si(OR^{10})_3$ group and combinations thereof. Examples of tetrafunctional silanes represented by the formula $Si(OR^9)_4$ are tetramethyl orthosilicate, tetraethyl orthosilicate, tetrapropyl orthosilicate, tetraisopropyl orthosilicate, tetrabutyl orthosilicate, tetraisobutyl orthosilicate, tetrakis(methoxyethoxy)silane, tetrakis(methoxypropoxy)silane, tetrakis(ethoxyethoxy)silane, tetrakis(methoxyethoxyethoxy)silane, trimethoxyethoxysilane, dimethoxydiethoxysilane, triethoxymethoxysilane, poly(dimethoxysiloxane), poly(diethoxysiloxane), poly(dimethoxy-diethoxysiloxane), tetrakis(trimethoxysiloxy)silane, tetrakis(triethoxysiloxy)silane, and the like. In addition to the $R^9$ and $R^{10}$ substituents described above for the tetrafunctional silane, $R^9$ and $R^{10}$ taken with oxygen $(OR^9)$ and $(OR^{10})$ can be carboxylate groups. Examples of tetrafunctional silanes with carboxylate functionalities are silicon tetracetate, silicon tetrapropionate and silicon tetrabutyrate.

The compositions can include any suitable disilanes in amounts insufficient to render the coatings rigid. For example, the disilanes can be represented by the formula $(R^{11}O)_xR^{12}_{3-x}Si—R^{13}_y—SiR^{14}_{3-x}(OR^{15})_x$; where x is 0, 1, 2, or 3 and y is 0 or 1; $R^{12}$ and $R^{14}$ are either H, an alkyl group containing from about 1 to about 10 carbon atoms, a functionalized alkyl group, an alkylene group, an aryl group, an alkypolyether group, and combinations thereof; $R^{11}$ and $R^{15}$ are either H, an alkyl group containing from about 1 to about 10 carbon atoms, an acetyl group, and combinations thereof. If y is 1 then $R^{13}$ can be an alkylene group containing from about 1 to about 12 carbon atoms, an alkylenepolyether containing from about 1 to about 12 carbon atoms, an aryl group, an alkylene substituted aryl group, an alkylene group which may contain one or more olefins, S, or O. If x is 0 then $R^{12}$ and $R^{14}$ is Cl or Br. If y is 0 then there is a direct silicon-silicon bond. Examples of such disilanes include, but are not limited to, bis(triethoxysilyl)ethane, bis(triethoxysilyl)methane; bis (trichlorosilyl)methane, bis(triethoxysilyl)ethylene, 1,3-bis (triethoxysilyl)ethane, hex aethoxydisiloxane, and hexaethoxydisilane. The selection of the disilane, as well as the amount of such a disilane incorporated into the coating compositions, will depend upon the particular properties to be enhanced or imparted to either the coating composition or the cured coating composition.

The compositions can include any other suitable alkyl silanes (i.e, trifunctional silanes, difunctional silanes, monofunctional silanes, and mixtures thereof, hereinafter referred to as silane additives) in amounts insufficient to render the coatings rigid. The alkyl silane additives which can be incorporated into the coating compositions of the present invention can have the formula $R^{16}_x Si(OR^{17})_{4-x}$ where x is a number of 1, 2 or 3; $R^{16}$ is H, or an alkyl group containing from 1 to about 10 carbon atoms, a functionalized alkyl group, an alkylene group, an aryl group an alkoxypolyether group, and combinations thereof; $R^{17}$ is H, an alkyl group containing from 1 to about 10 carbon atoms, an acetyl group, and combinations thereof. Examples of silane additives represented by the above-defined formula are methyltrimethoxysilane, ethyltrimethoxysilane, propyltrimethoxysilane, butyltrimethoxysilane, isobutyltrimethoxysilane, hexyltrimethoxysilane, octyltrimethoxysilane, decyltrimethoxysilane, cyclohexyltrimethoxysilane, cyclohexylmethyltrimethoxysilane, 3-methacryloxypropyltrimethoxysilane, vinyltrimethoxysilane, allyltrimethoxysilane, dimethyldimethoxy-silane, 2-(3-cyclohexenyl)ethyltrimethoxysilane, 3-cyanopropyl-trimethoxysilane, 3-chloropropyltrimethoxysilane, 2-chloroethyltrimethoxysilane, phenethyltrimethoxysilane, 3-mercaptopropyltrimethoxysilane, 3-aminopropyltrimethoxysilane, phenyltrimethoxysilane, 3-isocyanopropyltrimethoxysilane, N-(2-aminoethyl)-3-aminopropyltrimethoxysilane, 4-(2-aminoethylaminomethyl)phenethyltrimethoxysilane, chloromethyltriethoxysilane, 2-chloro-ethyltriethoxysilane, 3-chloropropyltriethoxysilane, phenyltriethoxysilane, ethyltriethoxysilane, propyltriethoxysilane, butyltriethoxysilane, isobutyltriethoxysilane, hexyltriethoxysilane, octyltriethoxysilane, decyltriethoxysilane, cyclohexyl-triethoxysilane, cyclohexylmethyltriethoxysilane, 3-methacryloxypropyltriethoxysilane, vinyltriethoxysilane, allyltriethoxysilane, [2-(3-cyclohexenyl)ethyltriethoxysilane, 3-cyanopropyltriethoxysilane, 3-methacrylamidopropyltriethoxysilane, 3-methoxypropyltrimethoxysilane, 3-cthoxypropyltrimethoxysilane, 3-propoxypropyltrimethoxysilane, 3-methoxyethyltrimethoxysilane, 3-ethoxyethyltrimethoxysilane, 3-propoxyethyltrimethoxysilane. The selection of the silane additive, as well as the amount of such silane additive incorporated into the coating compositions, will depend upon the particular properties to be enhanced or imparted to either the coating composition or the cured coating composition.

In certain applications, it can be useful to add colloidal silica to the coating composition in amounts insufficient to render the cured coating rigid. Colloidal silica is commercially available under a number of different tradename designations, including Nalco (Nalco Chemical Co., Naperville, Ill.); Nyacol (Nyacol Products, Inc., Ashland, Mass.); Snowtex (Nissan Chemical Industries, LTD., Tokyo, Japan); Ludox (DuPont Company, Wilmington, Del.); and Highlink OG (Clariant, Charlotte, N.C.). The colloidal silica is an aqueous or organic solvent dispersion of particulate silica and the various products differ principally by particle size, silica concentration, pH, presence of stabilizing ions, solvent makeup, and the like. It is understood by those skilled in the art that substantially different product properties can be obtained through the selection of different colloidal silicas.

Colloidal silica, when added to a coating composition, is considered a reactive material. The surface of the silica is covered with silicon bound hydroxyls, some of which are deprotonated, which can interact with materials in the coating composition. The extent of these interactions is dictated by a variety of factors, including solvent system, pH, concentration, and ionic strength. The manufacturing process further affects these interactions. Those skilled in the art recognize that colloidal silica can be added into a coating formulation in different ways with different results. The colloidal silica can be added to the coating composition at any suitable time.

The addition of colloidal silica to the coating compositions of the present invention can further enhance the abrasion resistance of the cured coating compositions and can further contribute to the overall stability of the coating compositions. In the same manner, other metal oxides may be added to the coating compositions of the present invention. Such additions may be made instead of, or in addition to, any colloidal silica additions. Metal oxides may be added to the inventive coatings to provide or enhance specific properties of the cured coating, such as abrasion resistance, refractive index, antistatic, anti-reflectance, weatherability, etc. Those skilled in the art recognize that the same types of reasons for including the colloidal silica in the compositions of the present invention also apply more generally to including metal oxides. Examples of metal oxides that may be used in the coating compositions of the present invention include silica, zirconia, titania, ceria, tin oxide, and combinations thereof.

The amount of colloidal silica incorporated into the coating compositions of the present invention can vary widely and will generally depend on the desired properties of the cured coating produced from the coating compositions, as well as the desired stability of the coating compositions. Similarly, the amount of metal oxides incorporated into the coating compositions of the present invention can vary widely and will generally depend on the desired properties of the cured coating produced from the coating compositions, as well as the desired stability of the coating compositions. The colloidal silica and/or metal oxides will generally have a particle size in the range of 2 to 150 millimicrons in diameter, and more desirably, a particle size in the range of from about 2 to 50 millimicrons.

Although a catalyst is not an essential ingredient of the present invention, the addition of a catalyst can affect abrasion resistance and other properties of the coating, including stability, porosity, cosmetics, caustic resistance, water resistance, etc. The amount of catalyst used can vary widely, but when present will generally be in an amount sufficient to provide from about 0.1 to about 10 weight percent, based on the total solids of the coating composition.

Examples of catalysts that can be incorporated into the coating compositions of the present invention include, but are not limited to, (i) metal acetylacetonates, (ii) diamides, (iii) imidazoles, (iv) amines and ammonium salts, (v) organic sulfonic acids and their amine salts, (vi) alkali metal salts of carboxylic acids, (vii) alkali metal hydroxides and (viii) fluoride salts. Thus, examples of such catalysts include for group (i) such compounds as aluminum, zinc, iron and cobalt acetylacetonates; for group (ii) dicyandiamide; for group (iii) such compounds as 2-methylimidazole, 2-ethyl-4-methylimidazole and 1-cyanoethyl-2-propylimidazole; for group (iv) such compounds as benzyldimethylamine, and 1,2-diaminocyclohexane; for group (v) such compounds as trifluoromethanesulfonic acid; for group (vi) such compounds as sodium acetate; for group (vii) such compounds as sodium hydroxide, and potassium hydroxide; and for group (viii) such compounds as tetra n-butyl ammonium fluoride, and the like.

An effective amount of a leveling or flow control agent can be incorporated into the composition to spread more evenly or level the composition on the surface of the substrate and to provide substantially uniform contact with the substrate. The amount of the leveling or flow control agent can vary widely, but can be an amount sufficient to provide the coating composition with from about 10 to about 5,000 ppm of the leveling or flow control agent. Any conventional, commercially available leveling or flow control agent which is compatible with the coating composition and the substrate, which is capable of leveling the coating composition on a substrate, and which enhances wetting between the coating composition and the substrate can be employed. The use of leveling and flow control agents is well known in the art and has been described in the "Handbook of Coating Additives" (ed. Leonard J. Calbo, pub. Marcel Dekker), pg 119-145, the entire contents of which are hereby expressly incorporated herein by reference in their entirety.

Examples of such leveling or flow control agents which can be incorporated into the coating compositions of the present invention include, but are not limited to, organic polyethers such as TRITON X-100, X-405, and N-57 from Rohm and Haas, silicones such as Paint Additive 3, Paint Additive 29, and Paint Additive 57 from Dow Corning, SILWET L-77 and SILWET L-7600 from OSi Specialties, and fluorosurfactants such as FLUORAD FC-4430 from 3M Corporation.

In addition, other additives can be added to the coating compositions of the present invention to enhance the usefulness of the coating compositions or the coatings produced by curing the coating compositions. For example, ultraviolet absorbers, antioxidants, and the like can be incorporated into the coating compositions of the present invention if desired.

In one embodiment, ultraviolet stabilizers can be added to the coating compositions. Any suitable ultraviolet stabilizer and radical scavenger may be used in the present invention at any concentration effective to protect a substrate from the degradative effects of light. The use of these additives is described in the "Handbook of Coating Additives" (ed. Leonard J. Calbo, pub. Marcel Dekker), pg 225-269. In another embodiment, ultraviolet stabalizers can be added to the primer compositions.

In another embodiment, a surfactant or mix of surfactants can be included in the coating compositions to provide the coated article with anti-fogging properties. Including surfactant results in a high wetting tension on the surface of the dried coating, and the high wetting tension prevents the formation of minute droplets, i.e., fog, on the coating surface. The surfactant further enhances the wet-out of the water to maintain a clear, non-fogged surface. An example of a suitable surfactant is Dioctylsulfosuccinate, available as Aerosol OT 75 from Cytec Industries Inc. West Patterson, N.J. The surfactant component can be present at about 0.4 to 15% weight percent of the coating composition. Higher levels can be used; however, they can result in an increase in haze, which can be undesirable for many applications. The anti-fogging effect of coatings can be measured by storing the article with the cured coating on the surface at 20° C., and then subjecting the coated article to saturated water vapor at 60° C. If the coated article becomes clear after 10 seconds and remains clear for at least 1 minute, the coating is anti-fogging.

The coating compositions can be made in any suitable manner. For example, the at least one of the epoxy functional silane and the diol functional organopolysiloxane and the multifunctional crosslinker can be added to a solvent and water and allowed to react at room temperature overnight. Additional additives, such as a leveling agent, may then be added. The coating composition can be applied to a substrate and cured to form a coating.

In accordance with embodiments of the present invention, an article can be provided. The article can comprise a substrate and a coating formed on at least one surface of the substrate by curing coating compositions of the present invention. Any suitable substrate may be coated with the coating compositions of the present invention. For example, plastic materials, wood, metal, printed surfaces, and leather can be coated. The compositions are especially useful as coatings for synthetic organic polymeric substrates in sheet or film form, such as acrylic polymers, poly(ethyleneterephthalate), polycarbonates, polyamides, polyimides, copolymers of acrylonitrile-styrene, styrene-acrylonitrile-butadiene copolymers, polyvinyl chloride, butyrates, and the like. Transparent polymeric materials coated with these compositions are useful as flat or curved enclosures, such as windows, skylights and windshields, especially for transportation equipment. Plastic lenses, such as acrylic, poly(diethylene glycol-bis-allyl carbonate) (ADC) or polycarbonate lenses, can also be coated with the compositions of the invention.

The coating compositions can be coated on the substrates in any suitable manner. For example, the compositions of the invention can be applied to solid substrates by conventional methods, such as flow coating, spray coating, curtain coating, dip coating, spin coating, roll coating, etc. to form a continuous surface film.

By choice of proper coating composition, application conditions and pretreatment (including the use of primers) of the substrate, the coating compositions of the present invention can be adhered to substantially all solid surfaces. After application of the coating compositions of the present invention to solid substrates, the coatings can be heat cured at any suitable temperature for any suitable period of time. For example, the coatings can be heat cured at temperatures in the range of 50 to 200° C. or more for a period of from seconds to 18 hours or more. It will be understood that the coatings can be cured in any other suitable manner. For example, an ultraviolet activated photoinitiator capable of initiating cationic cure can be added so the coating can be at least partially cured by ultraviolet light. It will be understood that the coatings can be subsequently cured by another process such as a heat cure. Any suitable photoinitiator can be used. For example, aromatic onium salt or iron arene salt complexes available from Ciba Specialty Chemicals Corp., Terrytown, N.Y. can be used.

The coating thickness can be varied by means of the particular application technique, but coatings having a thickness of from about 0.5 to 20 microns or from about 1 to about 10 microns can be used. It will be understood that the coatings can be substantially transparent.

In accordance with one embodiment of the present invention, the coating compositions may be applied to a substrate having a primer disposed thereon. Any suitable primer can be used. For example, a polyurethane dispersion based primer can be used. Examples of such suitable primers are detailed in U.S. Pat. No. 5,316,791, the entire contents of which is incorporated herein expressly by reference. An example of a such a suitable primer is PR1180 available from SDC Technologies, Inc., Anaheim, Calif. In another example, the primer can be modified with ultraviolet light absorbing substances and/or radical scavengers in order to increase the weatherability of the coated substrate. The primer can be applied to a substrate and air or thermally dried, e.g., air-dried for less than about 2 hours, and the coating composition can be subsequently applied and cured, after which the coated substrate may be formed.

In accordance with further embodiments of the present invention, formed articles are provided. The formed articles comprise a formed substrate having a coating in accordance with the present invention on at least one surface. The coating is applied to the formed articles prior to forming the article.

EXAMPLES

The following examples are for purposes of illustration only and are not intended to limit the scope of the claims which are appended hereto. All references cited herein are specifically incorporated by reference.

Example 1

Preparation of a Diol Functional Organopolysiloxane 1000 g of 3-glycidoxypropyltrimethoxysilane epoxy functional silane (A-187, Witco Corporation, Greenwich, Conn.) was added to a 5 liter glass flask fitted with a distillation apparatus. A mixture of 40 g HCl (0.05 N) and 2960 g of deionized water were then added to the 5 liter flask. The solution was then heated to reflux. After 3 hours of reflux, 743 g of solvent was removed by distillation. The product was used "as-is" without further purification.

Example 2

Coating Composition and Primer 7.5 grams of deionized (DI) water were added dropwise to a stirring solution of 15.0 grams of A-187, 19.3 grams of dihydro-3-(3-(triethoxysilyl)propyl)-2,5-furandione silylated multifunctional anhydride (GF20, Wacker chemical corporation, Adrian, Mich.), and 140.0 grams of isopropanol solvent. The mixture was stirred at room temperature overnight. 0.18 grams of a solution of leveling agent PA-57 (Dow Corning corporation, Midland, Mich.), 10 weight percent propylene glycol monomethyl ether (PM ether, Ashland Chemical, Columbus, Ohio) were added. The composition was left to stir for an additional 20 minutes after the addition of the PA-57 to insure mixing.

This coating composition was applied by flow coating to a PR-1180 (SDC Technologies, Inc., Anaheim, Calif.) primed ¼" thick polycarbonate plaque. After air-drying for 30 minutes, the coating was cured for 2 hours at 130° C. The haze gain results from a Taber test using CS-10F wheels in accordance with the procedure outlined herein were: 1.7% haze at 50 revolutions and 7.5% haze after 200 revolutions. The thickness of the topcoat was 3.5 microns. The formability of the coating was evaluated as described herein on a cylindrical mandrel and no crack was observed at 5" radius.

Example 3

Coating Composition and Primer 8.0 grams of DI water were added dropwise to a stirring solution of 17.7 grams of A-187, 15.2 grams of GF20, and 140.0 grams of isopropanol. The mixture was stirred at room temperature overnight. 0.18 grams of a solution of PA-57, 10 weight percent in PM glycol ether, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 2.3% haze at 50 revolutions and 11.4% haze after 200 revolutions. Thickness of the topcoat was 3.5 microns. Formability of the coating was evaluated on a cylindrical mandrel and no crack was observed at 4" radius.

Example 4

Coating Composition and Primer 17.0 grams of DI water were added dropwise to a stirring solution of 45.0 grams of A-187, 29.0 grams of GF20, and 280.0 grams of isopropanol. The mixture was stirred at room temperature overnight. 0.37 grams of a solution of PA-57, 10 weight percent in PM glycol ether, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 3.1% haze at 50 revolutions and 17.2% haze after 200 revolutions. Thickness of the topcoat was 3.2 microns. Formability of the coating was evaluated on a cylindrical mandrel and no crack was observed at 3" radius.

Example 5

Coating Composition and Primer 16.0 grams of DI water were added dropwise to a stirring solution of 47.0 grams of A-187, 20.0 grams of GF20, and 280.0 grams of isopropanol. The mixture was stirred at room temperature overnight. 0.36 grams of a solution of PA-57, 10 weight percent in PM glycol ether, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 5.3% haze at 50 revolutions and 38.1% haze after 200 revolutions. Thickness of the topcoat was 3.1 microns. Formability of the coating was evaluated on a cylindrical mandrel and no crack was observed at 3" radius.

Example 6

Coating Composition and Primer 15.0 grams of DI water were added dropwise to a stirring solution of 47.0 grams of A-187, 15.0 grams of GF20, and 260.0 grams of isopropanol. The mixture was stirred at room temperature overnight. 0.34 grams of a solution of PA-57, 10 weight percent in PM glycol ether, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 6.0% haze at 50 revolutions and 59.1% haze after 200 revolutions. Thickness of the topcoat was 3.2 microns. Formability of the coating was evaluated on a cylindrical mandrel and no crack was observed at 3" radius.

Example 7

Coating Composition and Primer 14.3 grams of DI water were added dropwise to a stirring solution of 30.0 grams of A-187, 38.6 grams of GF20, and 300.0 grams of PM glycol ether (PMOH) solvent. The mixture was stirred at room temperature for three days. 0.38 grams of a solution of PA-57, 10 weight percent in PMOH, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 3.0% haze at 50 revolutions and 14.0% haze after 200 revolutions. Thickness of the topcoat was 3.0 microns. Formability of the coating was evaluated on a cylindrical mandrel and no crack was observed at 3" radius.

Example 8

Coating Composition and Primer 16.2 grams of DI water were added dropwise to a stirring solution of 45.0 grams of A-187, 29.0 grams of GF20, and 300.0 grams of PM glycol ether (PMOH). The mixture was stirred at room temperature for three days. 0.39 grams of a solution of PA-57, 10 weight percent in PMOH, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 4.7% haze at 50 revolutions and 26.7% haze after 200 revolutions. Thickness of the topcoat was 3.0 microns. Formability of the coating was evaluated on a cylindrical mandrel and no crack was observed at 3" radius.

Example 9

Coating Composition and Primer 15.8 grams of DI water were added dropwise to a stirring solution of 47.2 grams of A-187, 20.3 grams of GF20, and 300.0 grams of PM glycol ether (PMOH). The mixture was stirred at room temperature for three days. 0.38 grams of a solution of PA-57, 10 weight percent in PMOH, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 5.8% haze at 50 revolutions and 34.5% haze after 200 revolutions. Thickness of the topcoat was 3.0 microns. Formability of the coating was evaluated on a cylindrical mandrel and no crack was observed at 3" radius.

Example 10

Coating Composition and Primer 15.0 grams of DI water were added dropwise to a stirring solution of 47.2 grams of A-187, 15.2 grams of GF20, and 265.0 grams of PM glycol ether (PMOH). The mixture was stirred at room temperature for three days. 0.34 grams of a solution of PA-57, 10 weight percent in PMOH, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 6.4% haze at 50 revolutions and 57.2% haze after 200 revolutions. Thickness of the topcoat was 3.0 microns. Formability of the coating was evaluated on a cylindrical mandrel and no crack was observed at 3" radius.

Example 11

Coating Composition and Primer 2.7 grams of DI water were added dropwise to a stirring solution of 3.8 grams of A-187, 9.7 grams of GF20, and 55 grams of isopropanol/PM glycol ether (1:1). The mixture was stirred at room temperature for three days. 0.08 grams of a solution of PA-57, 10 weight percent in PM glycol ether, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 1.6% haze at 50 revolutions and 5.6% haze after 200 revolutions. Thickness of the topcoat was 3.2 microns. Formability of the coating was evaluated on a cylindrical mandrel and no crack was observed at 6" radius.

Example 12

Coating Composition and Primer 4.0 grams of DI water were added dropwise to a stirring suspension of 15.0 grams of A-187, 1.8 grams of itaconic acid crosslinker, and 75.0 grams of isopropanol. The mixture was stirred at room temperature overnight. 0.10 grams of a solution of PA-57, 10 weight percent in PMOH, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 13.3% haze at 50 revolutions and 67.2% haze after 200 revolutions. Formability of the coating was evaluated on a cylindrical mandrel and no crack was observed at 3" radius.

Example 13

Coating Composition and Primer 4.0 grams of DI water were added dropwise to a stirring suspension of 15.0 grams of A-187, 1.4 grams of succinic anhydride crosslinker, and 70.0 grams of isopropanol. The mixture was stirred at room temperature overnight. 0.10 grams of a solution of PA-57, 10 weight percent in PMOH, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 36.2% haze at 50 revolutions. Formability of the coating was evaluated on a cylindrical mandrel and no crack was observed at 3" radius.

Example 14

Coating Composition and Primer 4.0 grams of DI water were added dropwise to a stirring suspension of 15.0 grams of A-187, 1.4 grams of succinic anhydride, and 70.0 grams of PM glycol ether (PMOH). The mixture was stirred at room temperature for three days. 0.10 grams of a solution of PA-57, 10 weight percent in PMOH, were added. The composition was left to stir for an additional 20 minutes after the addition of the PA-57 to insure mixing.

This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 42.0% haze at 50 revolutions. Formability of the coating was evaluated on a cylindrical mandrel and no crack was observed at 3" radius.

Example 15

Coating Composition and Primer

A mixture of 15.0 grams of trimethoxy(3-oxiranyl-methoxy)propylsilane hydrolyzed aqueous solution available as HS2926 (, SIVENTO Inc, Piscataway, N.J.), 9.66 grams of GF20, and 70.0 grams of isopropanol was stirred at room temperature overnight. 0.10 grams of a solution of PA-57, 10 weight percent in PM glycol ether, were added. The composition was left to stir for an additional 20 minutes after the addition of the PA-57 to insure mixing. This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 1.0% haze at 50 revolutions and 3.0% haze after 200 revolutions. Thickness of the topcoat was 3.0 microns. Formability of the coating was evaluated on a cylindrical mandrel and no crack was observed at 7" radius.

Example 16

Coating Composition and Primer

A mixture of 15.0 grams of HS2926, 9.66 grams of GF20, and 70.0 grams of PM glycol ether was stirred at room temperature overnight. 0.10 grams of a solution of PA-57, 10 weight percent in PM glycol ether, were added. The composition was left to stir for an additional 20 minutes after the addition of the PA-57 to insure mixing. This composition was aged at room temperature for 5 days before a coating application. The coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 1.34% haze at 50 revolutions and 4.19% haze after 200 revolutions. Thickness of the topcoat was 3.0 microns. Formability of the coating was evaluated on a cylindrical mandrel and no crack was observed at 7" radius.

Example 17

Coating Composition and Primer

A mixture of 15.0 grams of HS2926, 0.7 grams of succinic anhydride, and 30.0 grams of isopropanol was stirred at room temperature overnight. 0.05 grains of a solution of PA-57, 10 weight percent in PMOH, were added. The composition was left to stir for an additional 20 minutes after the addition of the PA-57 to insure mixing. This coating composition was applied by flow coating to a PR-1180 primed ¼" thick polycarbonate plaque. After air-drying for 30 minutes, the coating was cured for 2 hours at 130° C. Haze gain results from a Taber test using CS-10F wheels were: 26.0% haze at 25 revolutions. Formability of the coating was evaluated on a cylindrical mandrel and no crack was observed at 3" radius.

Example 18

Comparative Example Coating Composition and Primer

A commercially available SDC MP1154D (SDC Technologies, Inc., Anaheim, Calif.), a representative of coatings described in U.S. Pat. No. 6,001,163, was applied by flow coating to a PR-1180 primed ¼" thick polycarbonate plaque. After air-drying for 30 minutes, the coating was cured for 2 hours at 130° C. Haze gain results from a Taber test using CS-10F wheels were: 0.39% haze at 50 revolutions and 0.78% haze after 200 revolutions. Thickness of the topcoat was 3.0 microns. The coated sample was placed in an oven in accordance with the thermoforming procedure outlined herein. At 165° C., the coating cracked before it could be placed on a cylindrical mandrel.

Example 19

Comparative Example Coating Composition and Primer

A commercially available SDC MP1193A1 (SDC Technologies, Inc., Anaheim, Calif.), a representative of coatings described in U.S. Pat. No. 6,348,269, was applied by flow coating to a PR-1180 primed ¼" thick polycarbonate plaque. After air-drying for 30 minutes, the coating was cured for 2 hours at 130° C. Haze gain results from a Taber test using CS-10F wheels were: 0.22% haze at 50 revolutions and 0.47% haze after 200 revolutions. Thickness of the topcoat was 5.0 microns. The coated sample was placed in an oven in accordance with the thermoforming procedure outlined herein. At 165° C., the coating cracked before it could be placed on a cylindrical mandrel.

Example 20

Comparative Example Coating Composition and Primer

A commercially available SDC TC332 (SDC Technologies, Inc., Anaheim, Calif.), a representative of coatings described in U.S. Pat. No. 5,013,608 was applied by flow coating to a PR-1180 primed ¼" thick polycarbonate plaque. After air-drying for 30 minutes, the coating was cured for 2 hours at 130° C. Haze gain results from a Taber test using CS-10F wheels were: 1.48% haze at 50 revolutions and 3.57% haze after 200 revolutions. Thickness of the topcoat was 3.5 microns. The coated sample was placed in an oven in accordance with the thermoforming procedure outlined herein. At 165° C., the coating cracked before it could be placed on a cylindrical mandrel.

Example 21

Anti-Foe Coating Composition and Primer 1.91 grams of DI water were added dropwise to a stirring solution of 4.0 grams of A-187, 5.15 grams of GF20, and 40 grams of PM glycol ether. The mixture was stirred at room temperature overnight. 0.74 grams of surfactant sodium dioctyl sulfosuccinate in mixture of ethanol and water (OT-75) Van Waters & Rogers Inc., Kirkland, Wash.) (75% solid) was added. The composition was left to stir for two hours at room temperature and then aged at a 100 F warm room for 3 weeks before coating application.

This coating composition was applied by flow coating to a PR-1180 primed ¼" thick polycarbonate plaque. After air-drying for 30 minutes, the coating was cured for 2 hours at 130° C. Coating on the surface was stored at 20° C. and than subjected the coated article to saturated water vapor at 60° C. The coated article became clear after 10 seconds and remained clear for at least one minute. Haze gain results from a Taber test using CS-10F wheels were: 1.6% haze at 50 revolutions and 9.0% haze after 200 revolutions. Thickness of the topcoat was 3.2 microns. Formability of the coating was evaluated on a cylindrical mandrel and no crack was observed at 4" radius.

Example 22

Anti-Fog Coating Composition and Primer 2.11 grams of DI water were added dropwise to a stirring solution of 5.88 grams of A-187, 3.79 grams of GF20, and 39.2 grams of PM glycol ether. The mixture was stirred at room temperature overnight. 0.74 grams of OT-75 (75% solid) was added. The composition was left to stir for two hours at room temperature and then aged at a 100° F. for 3 weeks before coating application.

This coating composition was applied by flow coating to a PR-1180 primed ¼" thick polycarbonate plaque. After air-drying for 30 minutes, the coating was cured for 2 hours at 130° C. Coating on the surface was stored at 20° C. and than subjected the coated article to saturated water vapor at 60° C. The coated article became clear after 10 seconds and remained clear for at least one minute. Haze gain results from a Taber test using CS-10F wheels were: 4.8% haze at 50 revolutions and 33% haze after 200 revolutions. Thickness of the topcoat was 3.2 microns. Formability of the coating was evaluated on a cylindrical mandrel and no crack was observed at 4" radius.

Example 23

Comparative Example Anti-Fog Coating Composition and Primer

A commercially available SDC AF1140 (SDC Technologies, Inc., Anaheim, Calif.) was applied by flow coating to a PR-1180 primed ¼" thick polycarbonate plaque. After air-drying for 30 minutes, the coating was cured for 2 hours at 130° C. The coating on the surface was stored at 20° C. and than subjected to saturated water vapor at 60° C. The coated article became clear after 10 seconds and remained clear for at least 1 minute. Haze gain results from a Taber test using CS-10F wheels were: 3.20% haze at 50 revolutions and 14.3% haze after 200 revolutions. Thickness of the topcoat was 3.1 microns. Formability of the coating was evaluated on a cylindrical mandrel and crack was observed at less than a 10" radius.

Example 24

Coating and Weatherable Primer

A weatherable primer was prepared by mixing a Poly(oxy-1,2-ethanediyl), .alpha.-[3-[3-(2H-benzotriazo(-2-yl)-5-(1,1-dimethylethyl)-4-hydroxyphenyl)-1-oxopropyl]-.omega.-[3-[3[(2H-benzotriazol-2-yl)-5-(1,1-dimethylethyl)-4-hydroxyphenyl]-1-oxopropoxy], 30-45% by wt. and Poly(oxy-1,2-ethanediyl), .alpha.-[3-[3-(2H-benzotriazo(-2-yl)-5-(1,1-dimethylethyl)-4-hydroxyphenyl)-1-oxopropyl]-.omega.-hydroxy-, 40-55% by wt. (Tinuvin 1130, Ciba Specialty Chemicals Corporation, Tarrytown, N.Y.) into a commercially available PR1180 primer. Thus, 6.42 grams of Tinuvin1130 was added to 150 grams of PR1180. The resulting composition was left to stir for four hours before coating application.

This composition was applied as a primer by flow coating to a ¼" thick polycarbonate plaque. The primer was air dried for one hour before application of a topcoat of Example 7. The final coating was cured for 2 hours at 130° C. Haze gain results from a Taber test using CS-10F wheels were: 2.0% haze at 50 revolutions and 11% haze after 200 revolutions. Formability of the coating was evaluated on a cylindrical mandrel and no crack was observed at 3" radius.

The weatherability of the coating was evaluated by both QUV and Weather-β-Meter. The coating doesn't show adhesion failure and crack after 200 hours exposure to ultraviolet light in both accelerated weathering testers. The QUV was operated under the condition of 8 hours UV cycle at 70° C. and 4 hours condensation cycle at 50° C. The Weather-O-Meter was operated according to ASTM 155-1.

Example 25

Coating and Weatherable Primer 3.0 grams of Tinuvin1130 was added to 150 grams of PR1180. The resulting composition was left to stir for four hours before coating application. This composition was applied as a primer by flow coating to a ¼" thick polycarbonate plaque. The primer was air dried for one hour before an application of a topcoat of example 7. The final coating was cured for 2 hours at 130° C.

Haze gain results from a Taber test using CS-10F wheels were: 2.7% haze at 50 revolutions and 12% haze after 200 revolutions. Formability of the coating was evaluated on a cylindrical mandrel and no crack was observed at 3" radius.

The weatherability of the coating was evaluated by both QUV and Weather-O-Meter. The coating doesn't show adhesion failure and crack until after 200 hours exposure to ultraviolet light in both accelerated weathering testers. The QUV was operated under the condition of 8 hours UV cycle at 70° C. and 4 hours condensation cycle at 50° C. The Weather-O-Meter was operated according to ASTM 155-1.

It will be understood that various changes may be made without departing from the scope of the invention, which is not to be considered limited to what is described in the description.

What is claimed is:

1. A process for providing an abrasion resistant coating on a formable plastic substrate, comprising:
  applying a coating composition to a formable plastic substrate having a primer disposed on the formable plastic substrate, wherein the coating composition comprises,
    an aqueous-organic solvent mixture having hydrolysis products and partial condensates of at least one of an epoxy functional silane and a diol functional organopolysiloxane and at least one multifunctional crosslinker, wherein the multifunctional crosslinker comprises a silylated multifunctional anhydride, and wherein the at least one of the epoxy functional silane and the diol functional organopolysiloxane is present in a molar ratio to the multifunctional crosslinker from about 10:1 to 1:10, and an amount of water sufficient to hydrolyze the epoxy functional silane, the diol functional organopolysiloxane, and the silylated multifunctional crosslinker;

curing the coating composition to produce a formable coated plastic substrate; and forming the formable coated plastic substrate into a desired shape by heating the formable coated plastic substrate until the formable coated plastic substrate softens and shaping the softened formable coated plastic substrate into the desired shape.

2. The process of claim 1, wherein the step of curing occurs for a period of time up to about 1080 minutes at a temperature ranging from 50° C. to 200° C.

3. The process of claim 1, wherein the step of curing occurs for 120 minutes at a temperature of 130° C.

4. The process of claim 1, wherein the formable coated plastic substrate is formed into the desired shape using molding or vacuum forming.

5. The process of claim 1, wherein the formable plastic substrate comprises a polycarbonate polymer, an acrylic polymer, a poly(ethyleneterephthalate) polymer, a polyamide polymer, a polyimide polymer, an acrylonitrile-styrene copolymer, a styrene-acrylonitrile-butadiene copolymer, a polyvinyl chloride polymer, or a butyrate polymer.

6. The process of claim 5, wherein the formable plastic substrate is a polycarbonate polymer and the formable coated plastic substrate has a formability radius ranging from about 1 inch to about 10 inches.

7. The process of claim 5, wherein the formable plastic substrate is a polycarbonate polymer and the formable coated plastic substrate has a formability radius ranging from about 3 inches to about 7 inches.

8. The process of claim 5, wherein the formable plastic substrate is a sheet or film.

9. The process of claim 1, wherein the formable plastic substrate comprises a glazing or a transparent material used in a building, a train, a bus, a taxi, or an airplane.

10. The process of claim 9, wherein the coating composition comprises a stable coating composition that is useable for an amount of time suitable for applying the coating composition to the glazing or the transparent material.

11. The process of claim 1 further comprising applying the primer to the formable plastic substrate prior to the step of applying the coating composition.

12. The process of claim 11, wherein the primer comprises a polyurethane dispersion based primer.

13. The process of claim 1, wherein the primer comprises a polyurethane dispersion based primer.

14. The process of claim 1, wherein the primer is modified with an ultraviolet light absorbing substance.

15. The process of claim 1, wherein the primer is modified with a radical scavenger.

16. The process of claim 1, wherein the epoxy functional silane is represented by the formula $R^3_x Si(OR^4)_{4-x}$, wherein:

x is an integer of 1, 2, or 3;

$R^3$ is selected from the group consisting of H, an alkyl group, a functionalized alkyl group, an alkylene group, an aryl group, an alkyl ether group, wherein $R^3$ contains from 1 to about 10 carbon atoms when $R^3$ is not H, and wherein $R^3$ has at least 1 epoxy functional group;

$R^4$ is selected from the group consisting of H, an alkyl group containing from 1 to about 5 carbon atoms, an acetyl group, and a —$Si(OR^5)_{3-y} R^6_y$ group where y is an integer of 0, 1, 2, or 3;

$R^5$ is selected from the group consisting of H, an alkyl group containing from 1 to about 5 carbon atoms, an acetyl group, and a —$Si(OR^5)_{3-y} R^6_y$ group; and $R^6$ is selected from the group consisting of H, an alkyl group, a functionalized alkyl group, an alkylene group, an aryl group, and an alkyl ether group, wherein $R^6$ contains from 1 to about 10 carbon atoms when $R^6$ is not H.

17. The process of claim 1, wherein a solvent component of the aqueous-organic solvent mixture comprises from about 40% to about 98% of the coating composition by weight.

18. The process of claim 1, wherein the at least one of the epoxy functional silane and the diol functional organopolysiloxane comprises from about 5% to about 93% of the coating composition by weight of the total solids.

19. The process of claim 1, wherein the multifunctional crosslinker comprises from about 7% to about 95% of the coating composition by weight of the total solids.

* * * * *